United States Patent

[11] 3,550,729

| [72] | Inventor | August L. Underwood<br>9100 S. Vermont St., Los Angeles, Calif. 90044 |
|---|---|---|
| [21] | Appl. No. | 790,260 |
| [22] | Filed | Jan. 10, 1969 |
| [45] | Patented | Dec. 29, 1970 |

[54] BRAKE SHOE GAUGE TOOL ASSEMBLY
7 Claims, 6 Drawing Figs.

[52] U.S. Cl..................................................... 188/79.5, 188/1
[51] Int. Cl..................................................... F16d 65/42
[50] Field of Search........................................... 188/78.9, 79.5, 79.5SC, M, 196, 196M, SUV, (Inquired) 73

[56] References Cited
UNITED STATES PATENTS
2,045,882   6/1936   Stromgren.................... 188/79.5

*Primary Examiner*—Duane A. Reger
*Attorney*—William C. Babcock

ABSTRACT: A brake shoe gauge tool assembly for so positioning primary and secondary Bendix brake shoes relative to one another that when said shoes are in engagement with a star wheel adjustment screw, the shoes and screw may be reassembled on a backing plate with the assurance that the linings on said shoes are so spaced from the interior surface of the brake drum with which they will be used that no further adjustment of the brake shoes will be required. Prior to spacing of the brake shoes in the manner described, the external surfaces of the linings and the interior surface of the brake drum associated therewith are ground to the same radius of curvature.

PATENTED DEC 29 1970
3,550,729
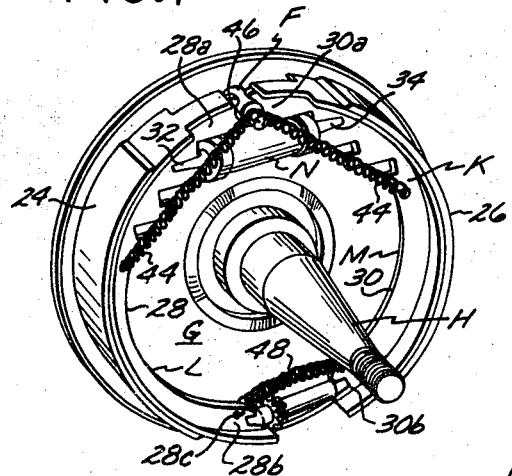
FIG.1
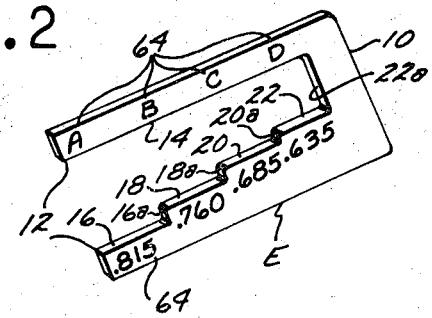
FIG.2
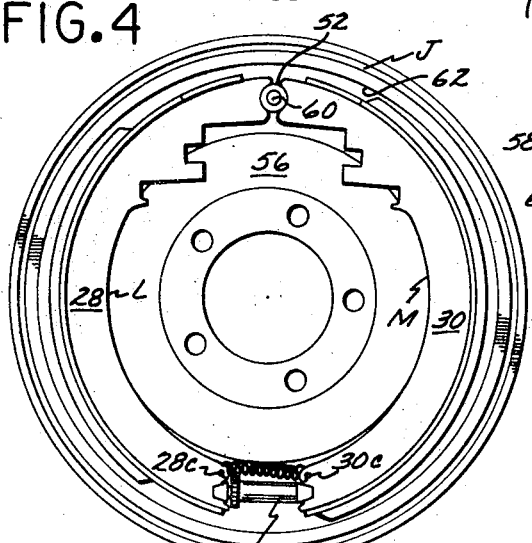
FIG.4
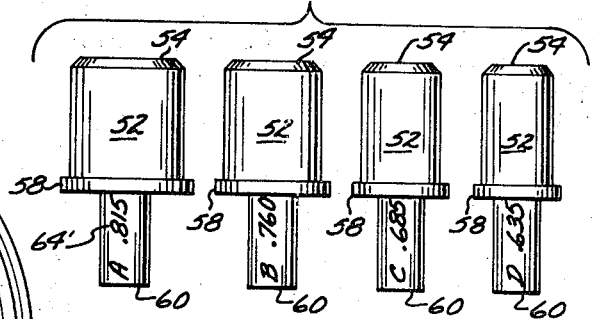
FIG.3
FIG.5
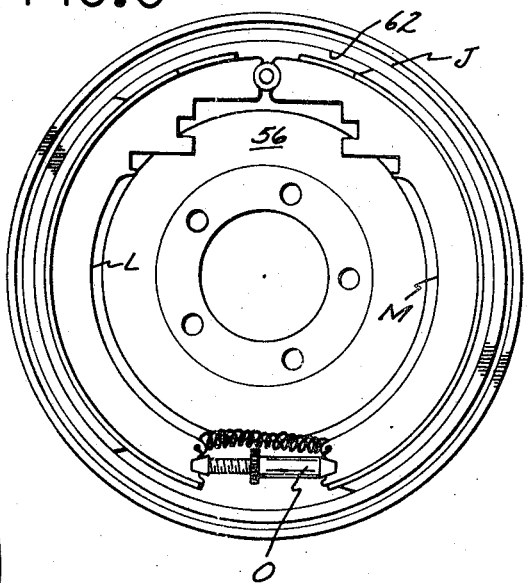
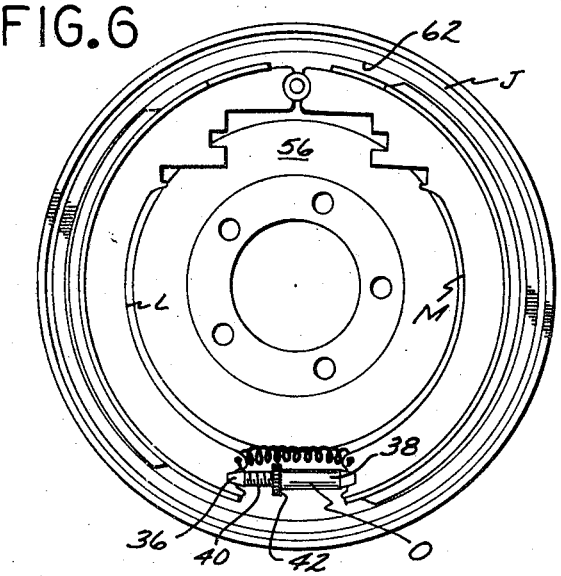
FIG.6
INVENTOR.
AUGUST L. UNDERWOOD
BY
William G. Babcock
ATTORNEY

BRAKE SHOE GAUGE TOOL ASSEMBLY

BACKGROUND OF THE INVENTION

1. Field of the Invention

A brake shoe gauge assembly for so positioning primary and secondary Bendix brake shoes relative to one another when in engagement with a star wheel adjusting screw that said shoes and adjustment screw may be reassembled on a backing plate in such relationship with a brake drum that no further adjustment of said shoes is necessary relative to said drum.

2. Description of Prior Art

In the maintenance of automotive equipment, it is normally necessary to replace the brake linings after 20,000 to 30,000 miles of use. When brake linings are replaced, it is frequently found that the interior surfaces of the brake drums are out of round and also scored. This out of roundness of the interior surface of the brake drum and the scored condition thereof is corrected by removing up to 0.030 inches of said surface, or a total of 0.060 inches in the diameter of the drum. It is the present day practice to provide oversize linings on brake shoes, and then grind the linings whereby the external surfaces thereof are of the same radius of curvature as the interior refinished surface of the brake drum.

In the past, shoes with the oversized linings thereon have been remounted on the backing plate and then, by a trial and error method, adjusted to conform to the diametrically enlarged interior surface of the brake drum. Such a method is time consuming, as well as unsatisfactory, for the new linings, even after multiple adjustments of the supporting shoes, the shoes often do not brake the vehicle with the same smoothness and efficiency as the original linings.

The present invention overcomes the prior disadvantages encountered in relining brakes by permitting the brake shoes, together with the new linings, to be assembled in the brake drum in which they will be used in properly spaced relationship, and in engagement with a star wheel adjustment screw. This spacing is maintained when the shoes and adjustment screw are mounted on the backing plate in engagement with an anchor pin, wheel cylinder, and the retraction springs. The brake drum and wheel may then be mounted on the spindle or shaft projecting from the backing plate with the assurance that no further adjustment of the shoes will be required.

SUMMARY OF THE INVENTION

A tool assembly including a step gauge for determining the diameter of an anchor pin, with each step being identified by a different insignia, and a number of replicas of said anchor pin of various diameters, with each of said replicas being identified by a second insignia corresponding to one of said first insignia.

After the diameter of the anchor pin has been determined by said gauge, the replica of that pin of the same diameter is placed in the inner peripheral portion of a brake drum which is in a substantially horizontal position. The newly lined brake shoes are then placed in the drum, with first ends thereof being in contact with the replica therein, and second ends of the shoes in engagement with a star wheel adjustment screw. The star wheel is rotated in a direction to cause the brake linings to frictionally grip the interior surface of the brake drum to the extent that the brake shoes cannot be lifted therefrom. The star wheel is then rotated one revolution in the opposite direction to separate the brake linings from the brake drum.

Thereafter, the brake shoes and adjustment screw are removed from the drum and mounted on the backing plate to engage the anchor pin and wheel cylinder. The retention springs and adjusting screw spring are then connected to the brake shoes. The brake drum and associated wheel may thereafter be mounted on the shaft or spindle projecting from the backing plate, with the assurance that the linings on the shoes are properly spaced from the interior surface of the brake drum and will require no further adjustment.

A major object of the present invention is to provide a tool assembly for easily and quickly mounting Bendix brake shoes on a backing plate in such relationship that when the brake drum and associated wheel are mounted on the shaft or spindle projecting from said backing plate, the linings on said shoes are properly spaced from the interior surface of said drum and require no further adjustment.

Another object of the invention is to supply a tool assembly of simple structure which can be fabricated from standard, commercially available materials, is easy to use, and one that will substantially reduce the time required in completing a brake relining job.

A still further object of the invention is to furnish a tool assembly by which brake shoes with new linings thereon may be placed in proper spaced relationship in the actual brake drum in which they will subsequently be used, and thereafter mounted on a backing plate in said relationship.

BRIEF DESCRIPTION OF THE DRAWINGS

FIG. 1 is a perspective view of Bendix brake shoes mounted on a backing plate, and in engagement with a star wheel adjustment screw and an anchor pin;

FIG. 2 is a perspective view of a step gauge used in determining the diameter of an anchor pin;

FIG. 3 is a side elevational view of a plurality of anchor pin replicas, with each replica being of different diameter, but a diameter of an anchor pin that is currently in use on modern automotive vehicles;

FIG. 4 is a top plan view of a primary and secondary brake shoe, each carrying a new brake lining, with the shoes being disposed in the brake drum with which they will be used in engagement with one of said replicas and a star wheel adjustment screw;

FIG. 5 is the same top plan view shown in FIG. 4, but with the brake shoes having been moved by manipulation of said star wheel to permit the linings of on said shoes to frictionally contact said brake drum to the extent that said brake shoes cannot be lifted from said drum; and FIG. 6 is the same plan view shown in FIG. 5, but with the shoes having been moved to positions where the linings are properly spaced from the interior surface of the drum and, as so spaced, may be mounted on the backing plate in the position shown in FIG. 1.

DESCRIPTION OF THE PREFERRED EMBODIMENT

The tool assembly, as may best be seen in FIG. 2, includes a slip gauge E that is used in determining the diameter of the anchor pin F shown in FIG. 1. Slip gauge E is formed from a rectangular sheet 10 of a rigid material, such as steel, or the like, in which an elongate recess 12 is formed. Recess 12 is defined by a first straight edge 14 and a number of second straight edges 16, 18, 20, and 22 that are disposed in stepped relationship and parallel to first edge 14. The upper extremities of edges 16, 18, 20, and 22 terminate in transverse stop edges 16a, 18a, 20a, and 22a, respectively, as best seen in FIG. 2.

Anchor pin F projects outwardly from the upper portions of a circular backing plate G secured in a fixed position to an automotive vehicle. A spindle or shaft H projects outwardly through an opening formed in the center of the backing plate G, which spindle or shaft rotatably supports a wheel (not shown) and associated brake drum J of the structure shown in FIGS. 4 and 6, inclusive. A hydraulically actuated brake assembly K of the Bendix type is associated with backing plates.

Assembly K includes a primary brake shoe L and secondary brake shoe M on which oversized brake linings 24 and 26, respectively, are mounted. Brake shoes L and M are arcuate, and include webs 28 and 30 on slotted first ends 28a and 30a which are in engagement with anchor pin F. A hydraulically operated horizontal wheel cylinder N is permanently mounted on the upper portion of backing plate G, and includes two oppositely movable piston rods 32 and 34 that removably engage webs 28 and 30, as shown in FIG. 1.

A star wheel adjustment screw O removably engages second ends 28b and 30b of webs 28 and 30, as shown in FIGS. 1, 4, 5, and 6. The adjustment screw O includes a slotted socket 36, pivot nut 38, and screw 40 from which a star wheel 42 projects.

Two tensioned helical retention springs 44 removably engage grooved portion 46 of anchor pin F, as may be seen in FIG. 1, and openings (not shown) in webs 28 and 30 adjacent the first ends 28a and 30a thereof. A tensioned helical adjustment spring 48 removably engages openings 28c and 30c in webs 28 and 30, as best seen in FIGS. 1, 4, 5, and 6.

When it is desired to reline the vehicle brakes, the brake drum J and associated wheel (not shown) are removed from the vehicle to expose the brake assembly K illustrated in FIG. 1. Retention springs 44 and adjustment spring 48 are removed from engagement with webs 28 and 30. Brake shoes L and M are then removed from backing plate G, and the old brake linings (not shown) stripped therefrom. The brake drum J is separated from the associated wheel (not shown), and is inspected to determine whether it is out-of-round and requires refinishing.

Invariably the interior surface of drum J will be scored and out-of-round, which is corrected by removing from up to 0.030 inches of metal therefrom. Oversized new brake linings 24 and 26 are then secured to the brake shoes L and M. The exterior surfaces of the new brake linings 24 and 26 are ground until they are of the same radius of curvature as the new interior surface 62 of brake drum J.

The diameter of anchor pin F is thereafter determined by slipping the gauge E downwardly thereover as far as possible. If gauge E can only be moved downwardly over pin F to the extent that the pin is disposed between edges 14 and 18a, it is an indication that the pin is 0.760 inches in diameter and the replica B should be used in spacing the brake shoes L and M prior to positioning them on backing plate G.

Each replica A, B, C, and D includes a cylindrical body 52 of the same diameter as that of an anchor pin currently in use on automotive vehicles incorporating a Bendix brake assembly. The brake drum J is then laid on a flat horizontal surface, and the selected replica disposed on an inner peripheral portion of the drum. The first end 54 of the replica rests on the flat inner surface 56 of brake drum J. For ease in handling, each replica A, B, C, and D is provided with a circumferential bead 58 projecting outwardly from a second end of body 52, as well as a coaxially aligned handle 60 that is of smaller diameter than the body.

The brake shoes L and M, and adjustment screw O are then disposed in brake drum J, with the brake shoes being in engagement with replica B, as illustrated in FIG. 4. Thereafter star wheel 42 is rotated in a direction to pivot brake shoes L and M outwardly until linings 24 and 26 pressure contact brake drum J with sufficient force that the brake shoes cannot be lifted outwardly therefrom.

Star wheel 42 is then rotated one revolution in the opposite direction to space the linings 24 and 26 from the interior surface 62 of the brake drum J, as shown in FIG. 6. The spacing so obtained by the operation just described has been found to be proper for optimum braking of the vehicle (not shown) of which the backing plates G form a part.

The brake shoes L am and M, replica B, and adjustment screw O are thereafter removed from brake drum J and disposed on backing plate G in the condition shown in FIG. 1. The spaced relationship between brake shoes L and M, when disposed as shown in FIG. 1, is the same as that shown in FIG. 6, for in FIG. 1 the anchor pin F is merely substituted for the replica B thereof.

Brake drum J and the associated wheel (not shown) may now be mounted on spindle H, shown in FIG. 1, with the assurance that the linings 24 and 26 are properly spaced from the interior surface 62, and no further adjustment of the brake shoes L and M will be required.

The first insignia 64 on the gauge E that indicate particular lateral spacing between first edge 14, and second edges 16, 18, 20, and 22 may either be letters of the alphabet, or the actual lateral spacing between the previously mentioned edges, or both, as shown in FIG. 1. The actual spacing between the edges 14, 16, 18, 20, and 22 is unimportant, for the purpose of the first insignia is merely to assure the selection of a replica A, B, C, or D that is of the same diameter as the pin F which has been gauged. The second insignia 64' are shown in FIG. 3, and are the same as the first insignia 64.

I claim:

1. A tool assembly for so positioning a primary and a secondary brake shoe relative to one another when in engagement with a star wheel adjusting screw that when said brake shoes and adjusting screw are mounted on a backing plate, with said brake shoes being in engagement with an anchor pin, hydraulic wheel cylinder, a pair of retracting springs, an adjusting screw spring, which when a brake drum and wheel associated with that particular backing plate are mounted on a shaft projecting therefrom, the linings on said shoes will require no further adjustment relative to said drum, providing the exterior surfaces of said linings and the interior surface of said drum are of substantially the same radius of curvature, which assembly includes:

a. a gauge having a plurality of stepped openings formed therein of of different and decreasing widths that are each identified by a different first insignia, which gauge determines the diameter of said anchor pin when said gauge is slipped thereover; and b. a plurality of replicas of said anchor pin, each of which is identified by a second insignia corresponding to one of said first insignia, with the one of said replicas corresponding in diameter to that of said anchor pin being disposed in said brake drum when the same is in a substantially horizontal position to place first ends of said primary and secondary brake shoes in abutment thereagainst, the second ends of which brake shoes are in engagement with said star wheel adjusting screw, with said screw being rotated until said linings on said brake shoes being in pressure contact with said interior surface of said drum with sufficient force that said brake shoes will not separate from said drum when lifted upwardly relative thereto, with said star wheel adjusting screw when thereafter rotated one revolution in a direction to separate said linings from said interior surface of said drum so spacing said linings relative to said drum that when said brake shoes and star wheel adjusting screw are mounted on said backing plate with said brake shoes being in engagement with said anchor pin, hydraulic wheel cylinder, pair of retracting springs, and adjusting screw springs to permit mounting of said brake drum and wheel on said shaft with the assurance that no further adjustment of said brake shoes will be required relative to said brake drum.

2. A tool assembly as defined in claim 1 wherein said gauge is formed from a flat sheet of rigid material in which a longitudinally extending recess is formed, which recess is defined by a first straight side and a second side in which said steps are formed.

3. A tool assembly as defined in claim 1 wherein said insignia represent the actual diameters of said anchor pins.

4. A tool assembly as defined in claim 1 wherein said insignia comprise distinctive configurations other than numbers that represent the actual diameters of said pins.

5. A tool assembly as defined in claim 1 wherein each of said replicas further include: a coaxially aligned handle extending outwardly from one end thereof;

6. A tool assembly as defined in claim 5 wherein said handle is substantially smaller in diameter than said replicas.

7. A tool assembly as defined in claim 6 wherein a circumferentially extending bead projects outwardly from that end of said replica from which said handle projects.